Oct. 30, 1945.   J. S. JOHNSON   2,387,996
HAY FORK
Filed June 21, 1944   2 Sheets-Sheet 1
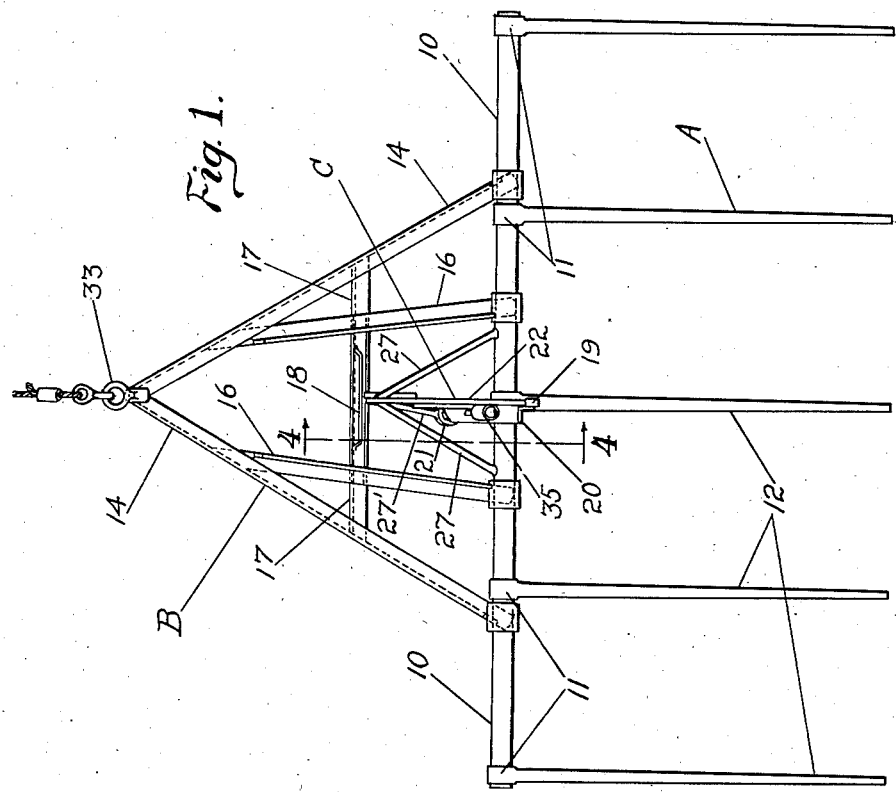
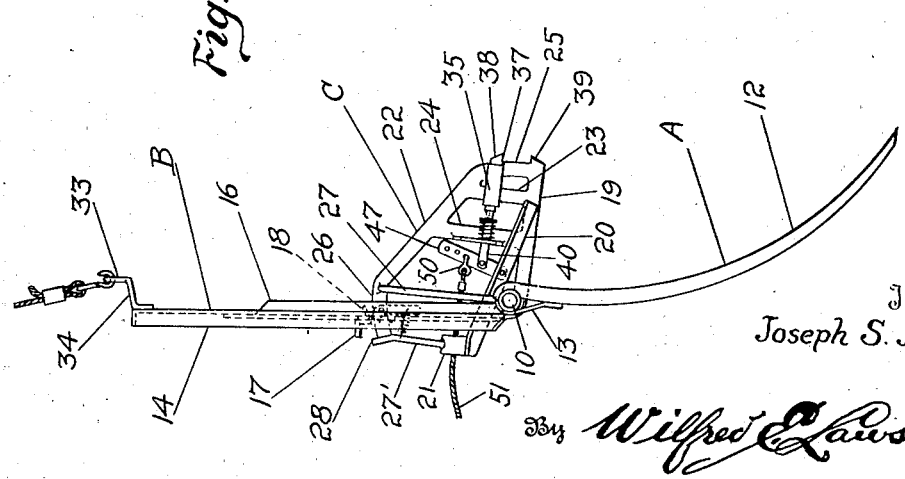
Inventor
Joseph S. Johnson.
By Wilfred E. Lawson
Attorney Oct. 30, 1945.    J. S. JOHNSON    2,387,996
HAY FORK
Filed June 21, 1944    2 Sheets-Sheet 2
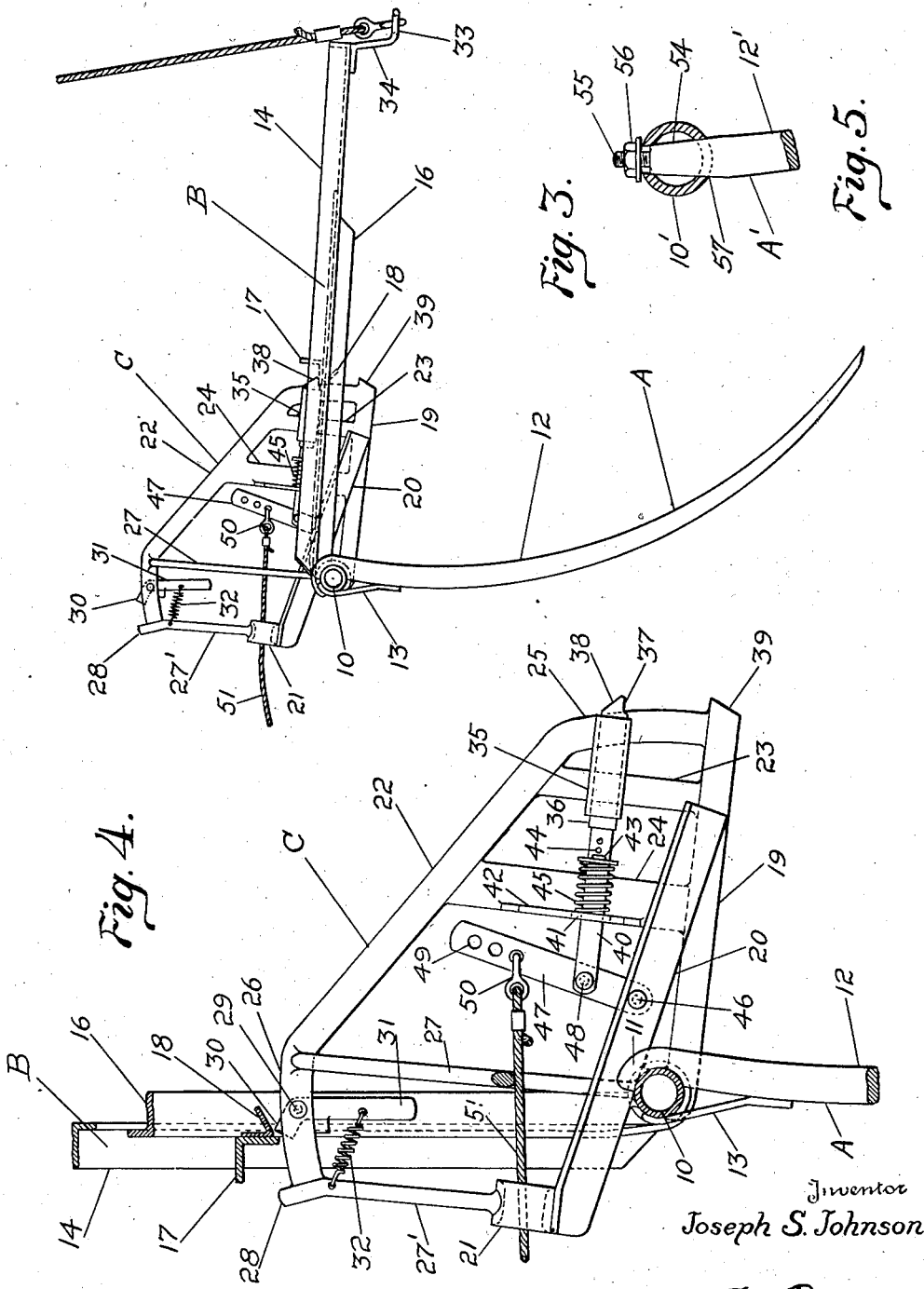
Inventor
Joseph S. Johnson.
By Wilfred E. Lawson
Attorney Patented Oct. 30, 1945

2,387,996

UNITED STATES PATENT OFFICE 2,387,996

HAY FORK

Joseph S. Johnson, Logan, Utah

Application June 21, 1944, Serial No. 541,306

6 Claims. (Cl. 294—124)

This invention relates generally to the class of material handling and pertains particularly to improvements in hay forks.

A principal object of the present invention is to provide an improved hay fork wherein the fork is pivotally attached to a suspension frame whereby the fork and frame may be disposed in a common plane for the convenient gravity actuated penetration of the fork tines into the hay, or may be disposed substantially perpendicular to one another, for the lifting of a load, with means of novel design, for releasably securing the frame and fork in either of the two stated relative positions.

Another object of the invention is to provide in a hay fork construction, a novel latching mechanism whereby upon the release of the loaded fork to swing downwardly into a plane common with the attached frame, the frame and fork unit will be automatically secured or latched in such common plane so that the fork will be automatically placed in position preparatory to a fresh engagement with a hay pile or other material to be picked up.

Still another object of the invention is to provide a hay fork of the character stated, with novel means for operatively coupling a trip or release cable with one of the two latches of the structure, by means of which the fork and the handling frame are maintained in load carrying position.

Other objects and advantages of the invention will become apparent as the description of the same proceeds and the invention will be best understood from a consideration of the following detailed description taken in association with the accompanying drawings, with the understanding, however, that the invention is not confined to a strict conformity with the showing of the drawings but may be changed or modified so long as such changes or modifications are within the scope of the appended claims.

In the drawings:

Figure 1 is a view in front elevation of the hay fork of the present invention showing the structure "open" ready for use.

Figure 2 is a view in side elevation of the structure as shown in Figure 1.

Figure 3 is a view in side elevation showing the frame in the position it assumes relative to the part preparatory to lifting the load.

Figure 4 is a section taken substantially on the line 4—4 of Figure 1.

Figure 5 is a detailed view illustrating another means of securing the fork tines to the fork bar.

Referring now more particularly to the drawings wherein like numerals of reference designate corresponding parts throughout the several views, the reference character "A" generally designates the fork while the character "B" generally designates the frame which is pivotally coupled with the fork.

The fork comprises the bar 10 which is of tubular form and to which are welded at spaced points therealong, as indicated at 11, the tines 12. These tines are braced by the short struts or brace rods 13, each of which extends from the back of a tine obliquely across the bar 10 upon the side thereof opposite from the point of connection of the tine therewith, such brace bar being welded or otherwise suitably secured to the main bar 10.

The frame B comprises the two bars 14 which are joined together at one end to form a V while the other end of each frame bar is attached to a collar 15 which is rotatably mounted upon the main fork bar or pipe 10 so that the frame B and the fork may have relative pivotal movement.

Intermediate brace bars 16 are connected between the main frame bars 14 and the fork bar 10 and these intermediate bars and the main bars 16 are joined together by the transversely extending latching bar 17 which is substantially parallel with the fork bar 10.

The several bars 14, 16 and 17 may be of angle iron or any other suitable form of material and the latching bar 17 has secured to the inner side thereof, by which is meant the side facing the same direction as the front of the fork, the latch actuator strip or flange 18, the function of which will become apparent from the succeeding description.

Fixed to the fork bar 10 is a latch frame which is generally designated "C." This latch frame comprises an arm 19 which is secured at one end to the fork bar 10 midway between the ends of the latter to extend forwardly. Overlying the arm 19 is a brace arm 20 which extends across the fork bar 10 and has its forward end secured to the arm 19 while upon its rearward end is fastened a rope or cable guide eye 21. The brace arm 20 passes over the top of the bar 10 and extends a substantial distance rearwardly with respect to the fork and the guide 21 is upon the top of this brace arm.

The numeral 22 generally designates the radius bar which is disposed at an elevation above the arms 19 and 20 and is supported in a vertical plane with the arm 19, by the vertical posts 23 and 24. This radius bar is disposed at a forward and downward inclination, the lower end portion being curved as indicated at 25 while the upper end portion is similarly curved as indicated at 26, these curvatures being struck from the center of the fork bar 10. The forward lower end of the radius bar is welded or otherwise secured to the forward end of the support arm 20 while the upper end of the radius bar at the curved portion 26 has joined thereto the downwardly and laterally diverging brace rods 27, the lower ends of which are joined to the fork bar 10.

The upper end of the radius bar has attached thereto the post 27', the lower end of which is mounted upon and secured to the eye 21 while the upper end projects above the upper and rear end of the radius bar, forming a stop 28 against which the latch bar 17 of the frame abuts when the frame and fork are relatively swung to occupy a common plane.

Pivotally mounted upon the upper end portion of the radius bar, rearwardly of the curve 26, on the pivot pin 29, is a free swinging latch finger 30 which is connected with or forms a part of the hanging lever 31. This lever 31 is connected by the spring 32, with the adjacent post 27' so that the lever is normally urged to swing rearwardly so as to lift the point of the latch 30 above the top edge of the adjacent part of the radius bar.

The latch bar 17 of the frame B is set with respect to the axial center of the fork bar 10, so as to move in close proximity to the outer sides of the curves 25 and 26 of the radius bar and when the latch bar moves relatively to the radius bar rearwardly past the latch 30 it will ride over the latch and come to rest between the latch and the stop 28 thereby locking the frame B and the fork A in substantially parallel relation or in a common plane so that the fork can be dropped to cause the points of the tines to penetrate a mass of hay or other material to be handled.

To facilitate the handling of the fork, the convergent bars 14 of the frame B have secured thereto the yoke 33. This yoke includes a shank portion 34 which is offset with respect to the yoke so that when the shank is attached to the joined ends of the bars 14 the yoke will be set in a plane slightly forwardly of the plane of the frame. Thus when the frame B swings relatively to the latching frame C so as to bring the latch bar 17 around or across the curved lower portion 25 of the radius bar this yoke will prevent the frame B from moving beyond a predetermined position with respect to the trip latch about to be described.

The trip latch above referred to comprises a guide 35 which is secured across the post 23 and the forward lower end of the radius bar, just below the curve 25, to extend forwardly or substantially in a parallel line with the arm 19.

Slidably disposed in the guide 35 is a latch bolt 36, the point 37 of which projects beyond the forward edge of the radius bar below the curve 25 and has the camming face 38 disposed upwardly so that the latch actuator flange 18 carried by the latch bar 17, may engage therewith and force the bolt rearwardly to permit the latching bar to engage between the bolt and the projecting end portion 39 of the arm 19, which functions as a stop.

The rear end of the bolt 36 has the reduced shank 40 which extends through a guide aperture 41 in a guide plate 42 which is attached to and extends laterally from the post 24. Between this plate 42 and a pin 43 which is positioned in one of several apertures 44 formed transversely of the shank 40, is a compression spring 45 which constantly urges the bolt 36 forwardly.

Pivotally supported as at 46, upon the arm 20, rearwardly of the post 24, is a lever 47 with which is pivotally coupled by the pin 48, the rear end of the bolt shank 40.

Above the pivot pin 48 the trip lever 47 has a series of apertures 49 in which may be selectively engaged the hook 50 with which is attached an end of the trip cable or rope 51 which passes rearwardly between the brace rods 27 and through the guide 21.

The post 27' functions to provide not only the stop 28 and a bracing means between the guide 21 and the upper rear end of the radius bar 22, but also to prevent the trip rope 51 hooking under the rear end of the radius bar during the use of the fork.

In the use of the present fork the rope or cable which is attached to the yoke 33 is controlled by suitable mechanism for raising and lowering the fork and for moving the fork horizontally from one position to another, and at the begining of the operation of loading the fork, the fork and frame will be arranged so that the frame extends vertically above the fork with the latch bar of the frame B engaged behind the latch 30. The tines of the fork will thus be directed downwardly and when the fork is allowed to drop into a hay pile or other material the tines will penetrate the material to a depth dependent upon the distance to which the fork has been dropped. The latch 30 is then released and the frame B is allowed to swing forwardly and downwardly to a position substantially perpendicular to the plane of the fork and to where the latch bar 17 will pass the trip latch bolt 36 and be engaged between the point of the bolt and the forward end 39 of the arm 19. When a lift is then applied to the fork through the rope or cable attached to the yoke 33, the fork will turn to substantially position the fork tines horizontally with the frame B vertical and thus a load of material will be picked up on the tines and can be transported to the dumping position. When the dumping position is reached the trip latch bolt 36 is retracted by applying a pull thereto through the medium of the lever 47 and rope or cable 51 whereupon the fork and the latch frame C will swing down to dump the load and the latch 30 will be moved across the latch bar 17 so as to again fix or secure the frame B and the fork unit A substantially in a common plane where the fork will again be ready for the insertion of the tines into the hay pile.

Figure 5 illustrates another means which may be employed for securing the tines of the fork to the fork bar. In this view, the fork is generally designated A', while the tine is designated 12' and the fork bar is designated 10'. The tine 12' has its upper end tapered as indicated at 54 and from this tapered portion there extends the threaded stem 55 which is adapted to receive a nut 56.

The bar 10' is provided with an opening 57 into which the tapered portion 54 of the tine is extended. As will be readily seen when the tapered portion of the tine is extended into the opening 57, the threaded stem 55 will project above the top of the bar so that when the nut 56 is threaded thereon it may be brought to bear against the bar and draw the tapered end of the tine tightly into the opening 57.

With this modified means of attaching the tines to the fork bar it will be readily seen that the tines may be easily and quickly removed for replacement or repair when and if necessary.

I claim:

1. A hay fork structure, comprising a fork unit having a back bar, a frame unit pivotally attached to the back bar to oscillate thereon for the assumption of two positions, one of said positions being in the plane of the fork and the other being in a plane perpendicular to the plane of the fork, means for attaching a lifting element to the frame, a latching frame secured to said bar and extending forwardly with respect to the fork and having a forward lower portion and an upper rear portion, a latch carried by the latching frame at each of the two portions thereof for securing the first frame in either of its two positions relative to the fork, the latch at the upper rear portion comprising a relatively long member pivoted to the portion to hang therefrom for swinging movement and an upwardly and rearwardly extending finger behind which a portion of the frame unit is adapted to engage, and means for manually actuating the other latch to release the latter from connection with the first mentioned frame.

2. A structure as set forth in claim 1, in which the latching frame comprises a relatively long bar, the bar being curved adjacent each of the two mentioned portions thereof, the latch at the upper portion being attached to the bar adjacent to the end of the upper portion and the manually controlled latch being attached to the latch bar adjacent to the end of the forward lower portion thereof.

3. A hay fork, comprising a fork body having a back bar, a frame pivotally mounted on the back bar to oscillate between a position where it is in a common plane with the fork and a position where it is in a plane perpendicular to the plane of the fork, a latch frame including an arm secured to said bar and extending forwardly with respect to the fork, an upwardly and rearwardly extending bar carried by said arm, the upper rearward end of the latch frame bar being disposed above the back bar, a swinging latch pivotally attached to the upper end of the latch frame bar, a reciprocable spring pressed latch carried at the lower end of the latch frame bar, means carried by the first frame for selective engagement behind said latches to secure the first frame and fork in either of the two stated relative positions, cable controlled means for retracting the second mentioned latch, and means carried by the first frame facilitating the attachment of a lift means thereto.

4. A hay fork structure as set forth in claim 3, with an arm extending rearwardly across the fork back bar to the rear side of the fork, and a guide carried upon the rear end of said arm for the said means for actuating the second mentioned latch.

5. A hay fork structure, comprising a fork having a back bar, a substantially triangular frame having the base portion pivotally attached to said bar, means at the apex portion of the triangular frame for the attachment of a lift means thereto, said frame being oscillatable upon said bar between a position where it is in a common plane with the fork and a position where it is perpendicular to the plane of the fork, a latch frame carried by the bar and comprising a rigid arm secured to said bar and extending forwardly with respect to the fork, a bar supported upon said arm and upon the fork back bar and arranged to extend upwardly and rearwardly with respect to the top of the fork, said latch frame bar having terminal curved portions having the center of the fork back bar as their centers, a latch bar carried by the first frame in position transversely of the latch frame bar for movement along the curved terminal portions thereof, stops at the ends of the latch frame bar for engagement by the latch bar, a pivoted latch carried adjacent the upper end of the latch frame bar, a spring actuated reciprocable latch supported adjacent the lower end of the latch frame bar, said latch bar being adapted for engagement behind the said latches between the same and the adjacent stops, and means facilitating the attachment of a trip cable with the reciprocable latch.

6. A hay fork structure as set forth in claim 5, in which said means comprises an oscillatable lever pivotally supported upon the latch frame, a pivotal coupling between the lever and the reciprocable latch, and a guide member supported above and rearward from the fork back bar in alignment with said lever for guiding the trip cable rearwardly from the lever.

JOSEPH S. JOHNSON.